(12) United States Patent
Kwon et al.

(10) Patent No.: US 12,592,836 B2
(45) Date of Patent: Mar. 31, 2026

(54) SYSTEMS AND METHODS FOR STREAMLINED PLATFORM COMPONENT ATTESTATION

(71) Applicant: Dell Products L.P., Round Rock, TX (US)

(72) Inventors: Hongsoon Kwon, Porter Ranch, CA (US); Chandrashekar Nelogal, Round Rock, TX (US); Jason Matthew Young, Round Rock, TX (US); Michael Rash, Mount Airy, MD (US)

( * ) Notice: Subject to any disclaimer, the term of this patent is extended or adjusted under 35 U.S.C. 154(b) by 0 days.

(21) Appl. No.: 18/780,898

(22) Filed: Jul. 23, 2024

(65) Prior Publication Data

US 2026/0032003 A1 Jan. 29, 2026

(51) Int. Cl.
*H04L 9/32* (2006.01)

(52) U.S. Cl.
CPC .................................. *H04L 9/3263* (2013.01)

(58) Field of Classification Search
CPC ...................................................... H04L 9/3263
See application file for complete search history.

(56) References Cited

U.S. PATENT DOCUMENTS

| | | | | | |
|---|---|---|---|---|---|
| 7,290,133 | B1 * | 10/2007 | Montgomery | ........ | H04L 9/3263 |
| | | | | | 713/175 |
| 12,113,915 | B2 * | 10/2024 | Ruan | ..................... | H04L 9/3252 |
| 12,388,661 | B2 * | 8/2025 | Gray | ..................... | H04L 9/3247 |
| 12,425,399 | B2 * | 9/2025 | Nagaraj | .............. | H04L 63/0876 |
| 2018/0026800 | A1 * | 1/2018 | Munoz | ................ | H04L 43/0817 |
| 2020/0099536 | A1 * | 3/2020 | Block | .................. | H04L 9/3236 |
| 2021/0319139 | A1 * | 10/2021 | Ruan | ..................... | G06F 21/602 |
| 2022/0121749 | A1 * | 4/2022 | Liu | ......................... | H04L 9/3239 |
| 2023/0237155 | A1 * | 7/2023 | Jacquin | .................. | G06F 21/57 |
| | | | | | 713/168 |
| 2023/0402854 | A1 * | 12/2023 | Nagaoka | ............. | H04L 63/0823 |
| 2023/0412397 | A1 * | 12/2023 | Gollent | ................ | H04L 9/0891 |
| 2024/0073036 | A1 * | 2/2024 | Hess, III | ................... | H04L 9/50 |
| 2025/0061181 | A1 * | 2/2025 | Ragavan | ................ | G06F 21/57 |

* cited by examiner

*Primary Examiner* — Darren B Schwartz
(74) *Attorney, Agent, or Firm* — Fogarty LLP

(57) ABSTRACT

Systems and methods for streamlined platform attestation are described. In an illustrative, non-limiting embodiment, an Information Handling System (IHS) may include a processor and a memory coupled to the processor. The memory may have program instructions stored thereon that, upon execution, cause the IHS to: read root certificates for a plurality of components of the IHS; and embed the root certificates for the plurality of components into a platform certificate.

20 Claims, 7 Drawing Sheets

600

200

400

700

SYSTEMS AND METHODS FOR STREAMLINED PLATFORM COMPONENT ATTESTATION

FIELD

This disclosure relates generally to Information Handling Systems (IHSs), and more specifically, to systems and methods for streamlined platform attestation.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for streamlined platform attestation are described. In an illustrative, non-limiting embodiment, an Information Handling System (IHS) may include a processor and a memory coupled to the processor, the memory having program instructions stored thereon that, upon execution, cause the IHS to read root certificates for a plurality of components of the IHS and embed the root certificates for the plurality of components into a platform certificate.

Components may include at least one of: the processor, the memory, a Graphics Processing Unit (GPU), a storage device, a network adapter, a power supply unit, a fan controller, an Input/Output (I/O) controller, a sensor, a Trusted Platform Module (TPM), or an Artificial Intelligence (AI)/Machine Learning (ML) device. For example, components are manufactured by one or more third-party suppliers or an Original Equipment Manufacturer (OEM).

The program instructions, upon execution, may cause the IHS to read the root certificates for the plurality of components from a database and insert the root certificates into a Certificate Signing Request (CSR). To embed the root certificates for the plurality of components into the platform certificate, the program instructions, upon execution, may cause the IHS to submit the CSR to a Certificate Authority (CA).

The CSR may include a signed blob of data for each component and a root certificate for each component. The program instructions, upon execution, may cause the IHS to issue another CSR to the CA in response to a change to the one or more of the plurality of components. The program instructions, upon execution, may cause the IHS to receive an updated platform certificate from the CA. The program instructions, upon execution, further cause the IHS to receive a request to verify one or more components.

According to another aspect, the program instructions, upon execution, may cause the IHS to provide the platform certificate to a verifier, where the verifier is configured to verify an identity of the one or more components based upon one or more corresponding root certificates for the plurality of components embedded into the platform certificate. The program instructions, upon execution, may cause the IHS to provide the chain of certificates and signed blob of data from each component to the verifier.

In another illustrative, non-limiting embodiment, a method may include receiving, by a verifier associated with a manufacturer of an IHS, a platform certificate associated with the IHS, where the platform certificate comprises a root certificate for a component of the IHS and cryptographically verifying, by the verifier based upon the root certificate for the component embedded in the platform certificate, an identity of the component.

The component may be manufactured by a third-party supplier or the manufacturer of the IHS. The platform certificate may be signed by a CA in response to a CSR submitted by the IHS, and the CSR may include the root certificate for the component.

In another illustrative, non-limiting embodiment, a hardware memory device may have program instructions stored thereon that, upon execution by a processor of an IHS, cause the IHS to embed root certificates for components of the IHS into a platform certificate, where the root certificates are cryptographically trusted by different verifiers associated manufacturers and verify the components based upon the platform certificate through a verifier associated with a manufacturer of the IHS.

To embed the root certificates, the program instructions, upon execution by the processor, may cause the IHS to issue a CSR to a CA. The CSR may include the root certificates.

The processor may be part of a heterogenous computing platform selected from the group consisting of a System-On-Chip (SoC), a Field-Programmable Gate Array (FPGA), and an Application-Specific Integrated Circuit (ASIC). The heterogenous computing platform comprises a Reduced Instruction Set Computer (RISC) processor coupled to the processor via an interconnect, and the interconnect comprises at least one of an Advanced Microcontroller Bus Architecture (AMBA) bus, a QuickPath Interconnect (QPI) bus, or a HyperTransport (HT) bus.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
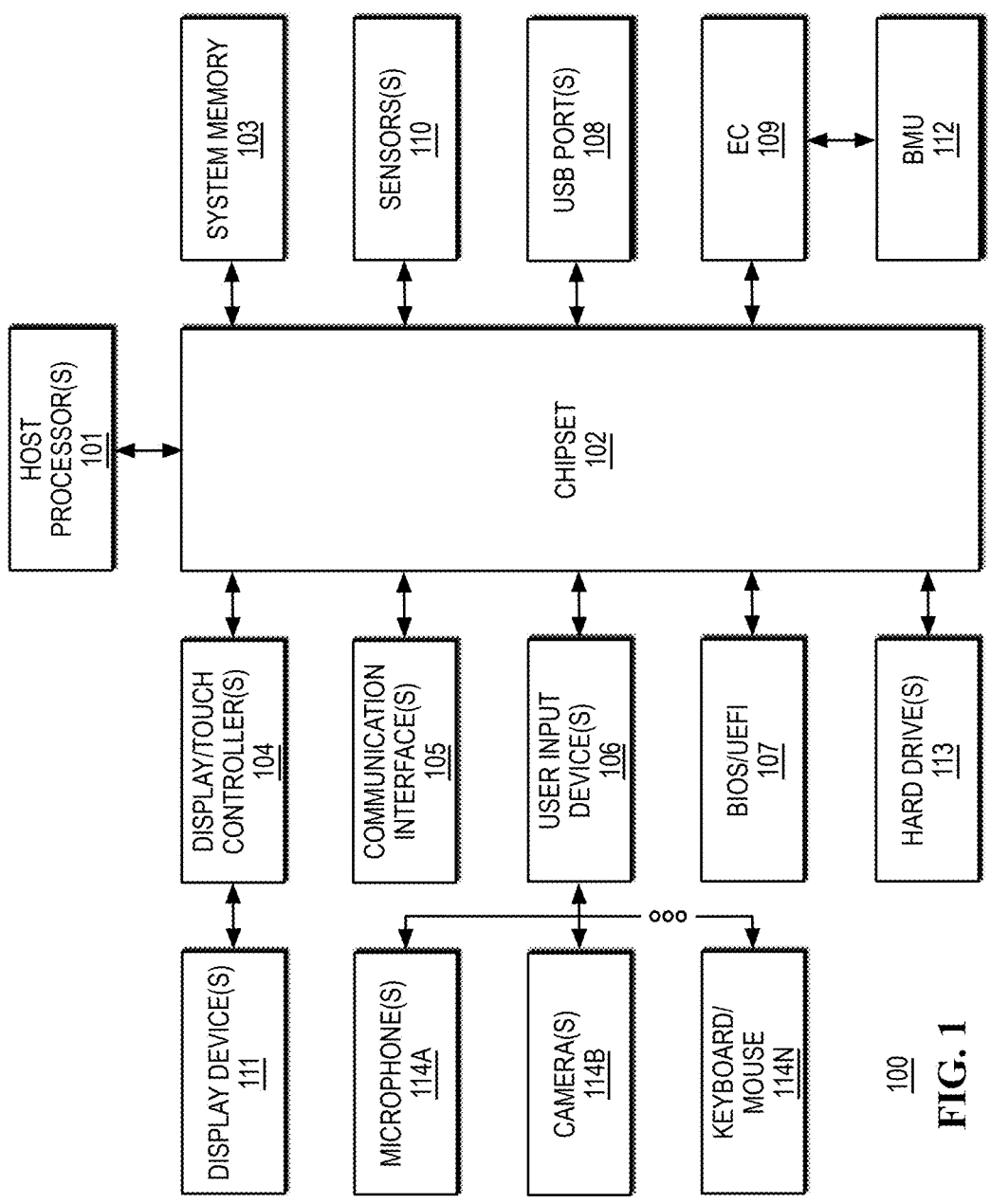
FIG. 1 is a diagram illustrating examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various Input/Output (I/O) devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) including a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

As used herein, the term "certificate" or "digital certificate" refers to a digital document used to verify the identity of entities and ensure secure communication. A certificate typically includes a public key and identifying information, and it is issued by a trusted Certificate Authority (CA). Certificates enable entities to authenticate each other and establish encrypted connections, ensuring data integrity and confidentiality. A type of digital certificate is the X.509 certificate, which is widely used in various security protocols, including SSL/TLS for secure web browsing and S/MIME for secure email communication.

In some embodiments, a "platform certificate" may be categorized as "base," "delta," or "rebase." Specifically, a "base platform certificate" may be independent and comprehensive, containing all the assertions made by its issuer for a particular platform without referencing any other platform certificate. A "delta platform certificate" may cover specific changes to the platform that are not covered by the existing certificate and must reference a previously issued base or delta platform certificate to provide a complete set of assertions. A "rebase platform certificate," like a base platform certificate, may be self-contained and include all the issuer's assertions. However, it may also reference a prior platform certificate (base or delta) to ensure transparency regarding the platform's previous modifications.

Typically, a "chain of certificates" begins with a root certificate, optionally followed by intermediate certificates, and ending with a leaf certificate. A chain of certificates links these certificates together, starting from the root certificate, through one or more intermediate certificates, until a leaf certificate, using a digital signature mechanism, thus establishing a chain of trust.

Particularly, the "root certificate" is issued by the Root CA and it is self-signed, serving as the anchor of trust. "Intermediate certificates" are issued by the root CA or another intermediate CA, creating a chain of trust between the root and leaf certificates. Finally, "leaf certificates" are issued to end entities (e.g., components) and signed by an intermediate CA, used for authenticating the entity.

As used herein, the term "attestor" refers to an entity that presents information it claims to be correct, typically in the form of a digitally signed certificate. The attestor provides cryptographic evidence to support its claims, which can be verified by another entity. A "verifier" is an entity that checks or verifies the validity of the information presented by the attestor. The verifier uses the attestor's certificates and other cryptographic data to confirm the authenticity and integrity of the attestor's claims. A "CA" is a trusted entity responsible for issuing digital certificates. The CA verifies the identity of entities requesting certificates and signs the certificates with its private key, establishing a chain of trust. The CA's public key is used by verifiers to verify the certificates issued by the CA.

In this context, a Certificate Signing Request (CSR) is a command, message, or a block of encoded text that is given to a CA when applying for a digital certificate. It may include the public key for which the certificate should be issued, along with identifying information such as the organization name, common name (domain name), locality, and country. The CA uses the CSR to create a digital certificate that matches the private key associated with the public key in the CSR.

Modern IHSs often include multiple components (e.g., processors, memories, Graphics Processing Units (GPUs), storage devices, network controllers, power supply, fan controllers, Input/Output (I/O) controllers, sensors, etc.), each requiring individual verification to ensure security and integrity. These components may possess their own certificates issued by respective authorities. The verification process involves verifying these certificates to establish the authenticity and trustworthiness of each component.

FIG. 1 is a block diagram of examples of components of IHS 100, according to some embodiments. As shown, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more Graphics Processor Units (GPUs) on a graphics bus, such as an Accelerated Graphics Port (AGP) or PCIe bus. As shown, display controller(s) 104 may provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality or "VR/AR" devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS)/Unified Extensible Firmware Interface (UEFI) 107 is coupled to chipset 102. In some situations, the terms "BIOS" and "UEFI" may be used interchangeably. In operation, BIOS/UEFI 107 provides an abstraction layer that allows a host OS to interface with certain hardware components utilized by IHS 100.

When IHS 100 is powered on, host processor(s) 101 may utilize program instructions of BIOS/UEFI 107 to initialize and test hardware components coupled to IHS 100, and to load host OS 312 for use by IHS 100. As used herein, the term "pre-boot" refers to the period of time, processes, and/or environment between the initialization of host processor(s) 101 and its taking over by host OS 312, after host OS 312 is loaded and operational.

Through a hardware abstraction layer provided by BIOS/UEFI 107, software stored in system memory 103 and executed by host processor(s) 101 may interface with certain I/O devices that are coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostic tests (or "diagnostics"), remediation over an OOB or sideband network, etc.

Unlike other devices in IHS 100, EC 109 may be operational from the time IHS 100 is first powered on, before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3.

EC 109 may implement operations for detecting certain changes to the physical configuration or posture of IHS 100

(such as a laptop computer). For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as part of a Trusted Execution Environment (TEE) component to the motherboard of IHS 100. As a component with hardware root-of-trust (ROT), EC 109 may be further configured to calculate hashes or signatures that uniquely identify individual components of IHS 100. In such scenarios, EC 109 may calculate a hash value based upon the configuration of a hardware and/or software component coupled to IHS 100. For instance, EC 109 may calculate a hash value based upon all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based upon instructions and settings loaded for use by a hardware component of IHS 100 and may compare the calculated value against the reference hash value to determine if any modifications have been made to the component, thus indicating that the component has been compromised. As such, EC 109 may verify the integrity of hardware and software components installed in IHS 100.

In some embodiments, EC 109 may provide an OOB (Out-Of-Band) or sideband channel that allows an Information Technology Decision Maker (ITDM) or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to EC 109.

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, temperature, battery usage data such as charging and discharging data; and/or IHS operating conditions such as processor operating speed data, system power management and cooling system settings, state of "system present" pin signal), environmental or context information (e.g., such as ambient temperature, relative humidity, system geolocation measured by GPS or triangulation, time and date, etc.), etc.

In various embodiments, EC 109 may be coupled (e.g., via a GPIO pin) to any of a plurality of IHS components including, but not limited to: a fan, a cable, a battery, a temperature sensor, or a display. Moreover, EC 109 may be configured to perform or trigger the performance of any number of diagnostic operations for any of these components. For example, in some cases EC 109 may be configured to request that display 111 perform a Built-In-Self-Test (BIST) and to return BIST results to EC 109 upon completion. In other cases, however, EC 109 may itself run the diagnostic operation.

In some embodiments, IHS 100 may not include all components shown in FIG. 1. In other embodiments, IHS 100 may include other components in addition to those shown in FIG. 1. Furthermore, some components illustrated as separate components in FIG. 1 may instead be integrated with other components, such that all or a portion of the operations executed by the illustrated components may instead be executed by the integrated component.

For instance, in various embodiments, host processor(s) 101 and/or other components shown in FIG. 1 (e.g., chipset 102, display controller(s) 104, communication interface(s) 105, EC 109, etc.) may be replaced by devices within a heterogenous computing platform. As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, iOS, WINDOWS MOBILE, etc.). More recently, however, IHS manufacturers have started producing fully-fledged desktop and laptop IHSs equipped with ARM-based, heterogenous computing platforms. Accordingly, host OSs (e.g., WINDOWS on ARM) have been developed to provide users with a familiar OS experience on those platforms.

Figure 2:
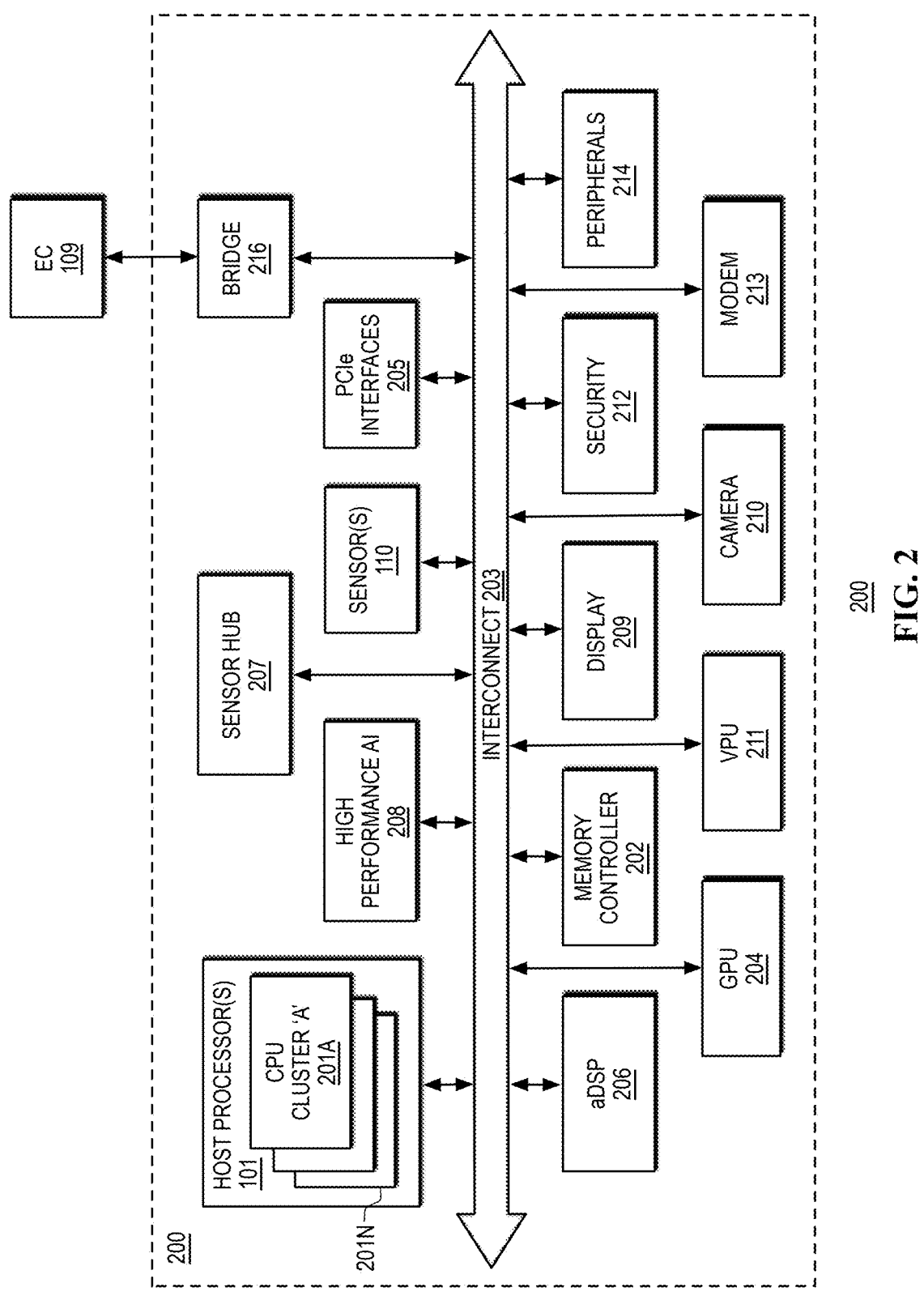
FIG. 2 is a diagram illustrating an example of a heterogenous computing platform, according to some embodiments.

FIG. 2 is a diagram illustrating an example of heterogenous computing platform 200 which may be implemented as part of IHS 100 and/or it may replace certain components shown in FIG. 1 (e.g., host processor(s) 101)). In various embodiments, heterogenous computing platform 200 may be implemented as one or more SoCs, FPGAS, ASICs, or the like.

Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is reduced.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 312 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.).

Devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

GPU 204 produces graphical or visual content and communicates that content to a monitor or display of IHS 100 for rendering. In some embodiments, display engine or controller 209 may be designed to perform additional video enhancement operations. In operation, display engine 209 may implement procedures for providing the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N).

In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit (I²C), Improved I²C (I³C), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogenous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, verification of digital certificates, etc.) and/or it may serve as a hardware RoT for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's interconnect fabric 203, including sensor hub 207 and sensor(s) 110. Through this connectivity supported by interconnect fabric 203, EC 109 may directly access and/or operate most or all of devices 201-216, 110 of heterogenous computing platform 200.

Figure 3:
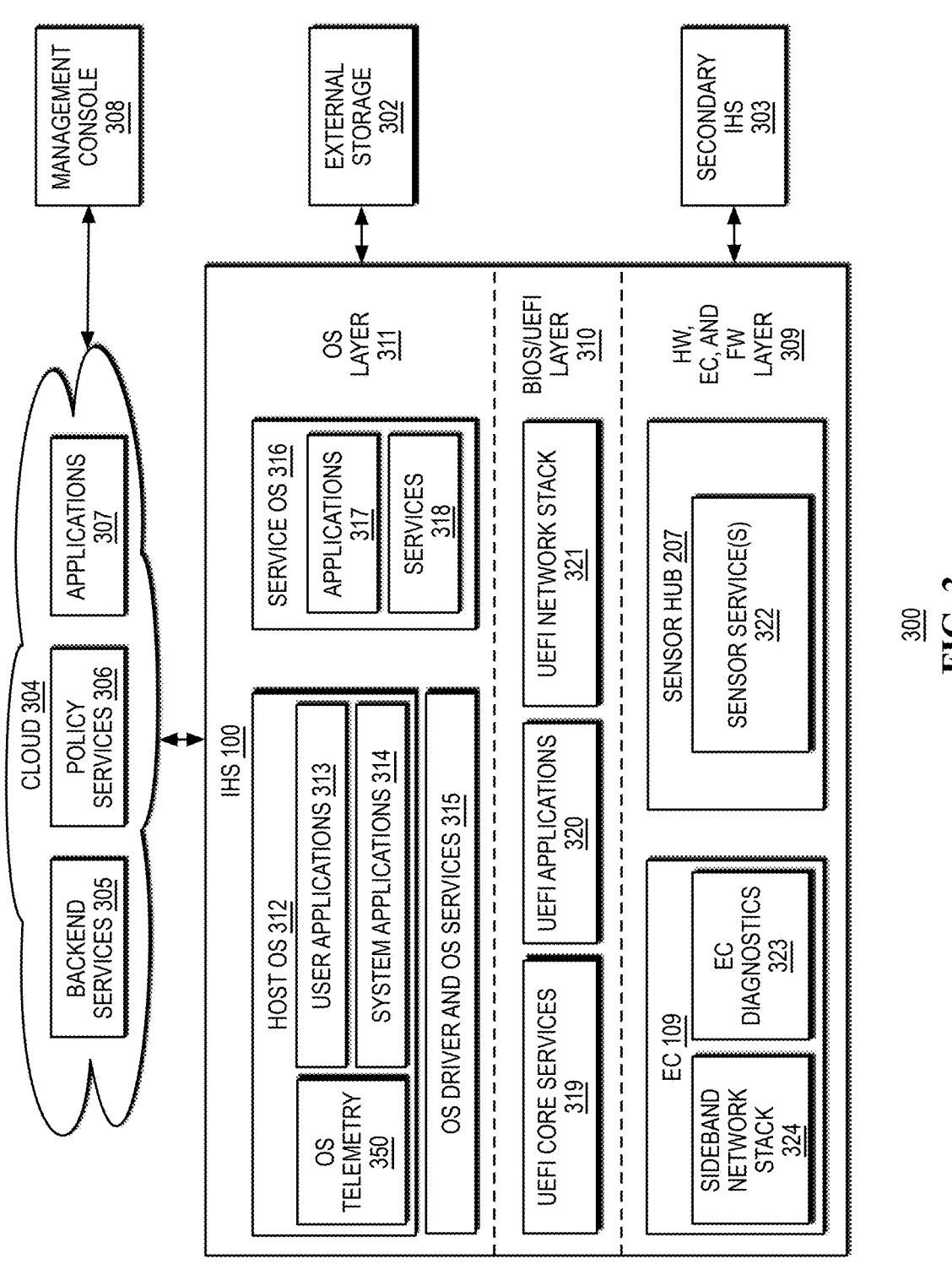
FIG. 3 is a diagram illustrating an example of a software and firmware architecture of an IHS, according to some embodiments.

FIG. 3 is a diagram illustrating an example of architecture 300 usable with IHS 100. Particularly, architecture 300 includes IHS 100 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 100 and/or secondary IHS 303, and configurable via ITDM management console 308.

IHS 100 may include hardware/EC/firmware layer 309, BIOS/UEFI layer 310, and OS layer 311. Specifically, OS layer 311 includes host OS 312 executed by host processor(s) 101. A variety of software applications may operate within OS 312, where these applications may include user applications 313 and system applications 314. Applications that operate within the OS 312 may also include one or more telemetry applications 350.

OS layer 311 may also include various drivers and other core OS operations, such as the operation of a kernel. As described, various components of heterogenous computing platform 200 may independently run their own OS, such as a Real-Time OS (RTOS) run by an SoC.

Within IHS 100, RTOSs executed by individual components of the heterogenous computing platform 200 are deemed distinct from service OS 316, which includes its own applications 317 and services 318. Hardware device drivers 315 used by host OS 312 and/or by service OSs 316 may support the operation of IHS 100 hardware.

BIOS/UEFI layer 310 may include pre-OS core services 319, pre-OS applications 320, and pre-OS network stack 321 that are each executed by BIOS/UEFI 107. BIOS core services 319 may include operations for identifying and verifying the detected hardware components of IHS 100. BIOS applications 320 may include operations for interfacing with certain hardware devices of IHS 100, in particular user input devices. The network stack 321 of BIOS 310 may be utilized during initialization of IHS 100 in support of verification procedures, such as in retrieving reference signatures corresponding to authentic firmware instructions for hardware components of IHS 100.

As illustrated, IHS 100 also includes hardware/EC/firmware layer 309 with EC 109 and sensor hub 207. As described above, EC 109 may implement a variety of procedures for management of individual hardware of IHS 100. EC 109 is configured to execute one or more sensor services 323 that interface with sensor hub 207 in implementing various operations, such response to user-presence determination by the sensor hub 207 that is acted upon by the EC 109 in initiation heightened security protocols. Moreover, EC 109 may interface with some or all individual hardware components/systems of IHS 100 via sideband management channels that are separate from inline communication channels used by host processor(s) 101 and SoCs.

As described above, sensor hub 207 may receive inputs from some or all sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of IHS 100. Shock detection procedures may detect shocks experienced by IHS 100 and may characterize and assess possible damage to IHS 100.

Figure 4:
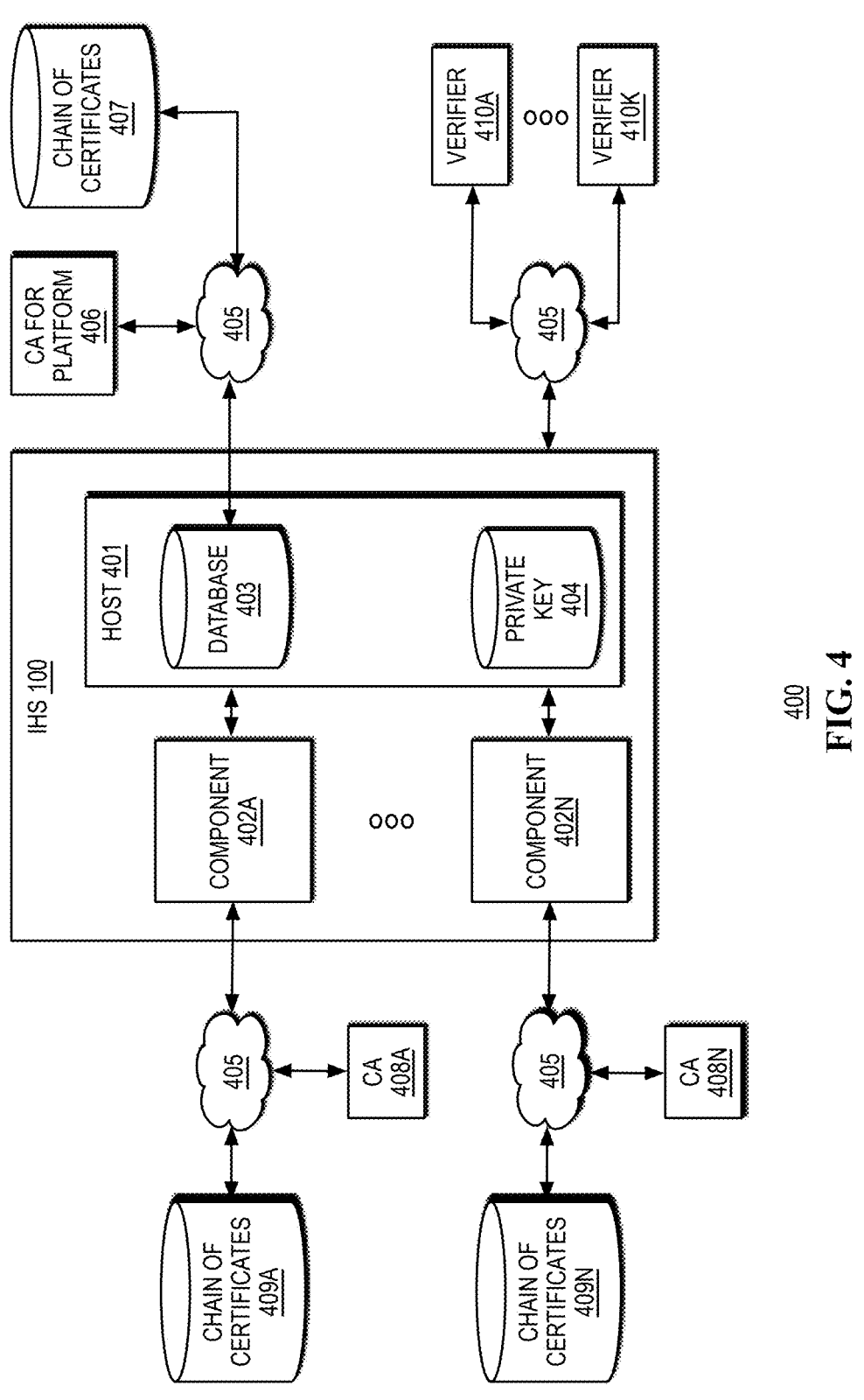
FIG. 4 is a diagram illustrating an example of a system for platform component attestation, according to some embodiments.

FIG. 4 illustrates an example of a system 400 for platform component attestation. In this case, IHS 100 attests certificates for individual components 402A-N with verifiers 410A-K. IHS 100 includes host 401 and multiple components 402A-N. Each of components 402A-N has a corresponding chain of certificates, which includes intermediate certificates and a root certificate issued by a respective CA 408A-N.

Host 401 serves as the central processing unit of the IHS 100, managing and coordinating the operations of the various components 402A-N. Host 401 may be responsible for receiving the chains of certificates from each of the components 402A-N and ensuring that the certificates are properly managed and stored. For example, 401 may include processor 101 and memory 103, which store program instructions that facilitate the attestation process.

Each of components 402A-N represents a distinct hardware or software element within the IHS 100. These components may include, but are not limited to, processors, memory modules, GPUs, storage devices, network adapters, power supply units, fan controllers, Input/Output (I/O) controllers, and sensors. Each of components 402A-N possesses a chain of certificates, which includes intermediate certificates. In some cases, the chain of certificates presented by a component may include a root certificate related to the chain but verifiers typically do not trust the root certificate from the component and, instead, acquire in advance the root certificate of component on its own, via some out-of-band method, to verify the chain of certificates presented by component. The chain of certificates serves to authenticate the identity and integrity of the component, ensuring that the component can be trusted within the IHS 100.

CAs 408A-N are trusted entities responsible for issuing the digital certificates for components 402A-N. At the time of the component's manufacturer, prior to having been deployed within IHS 100, CAs 408A-N verify the identity of a component requesting a certificate and signs the certificate with the private cryptographic key, establishing a chain of trust. The root certificate issued by each CA 408A-N serves as the anchor of trust for the corresponding component 402A-N.

Verifiers 410A-K are entities that verify the information presented by the components 402A-N. Each of verifiers 410A-K uses the respective ones of root certificates acquired from corresponding trusted sources 409A-N to verify the identity of corresponding ones of components 402A-N. Verifiers 410A-K ensure that components 402A-N are authentic and have not been tampered with, providing a layer of security and trust within the IHS 100.

The trusted sources 409A-N are repositories or databases that store the root certificates for components 402A-N.

These trusted sources 409A-N provide verifiers 410A-K with the necessary root certificates to verify the chains of certificates presented by components 402A-N. Trusted sources 409A-N may also ensure that verifiers 410A-K have access to the most up-to-date and accurate root certificates for components 402A-N.

The platform certificate for the IHS 100, stored in database 407, does not include the root certificates for components 402A-N. The root certificates for components 402A-N are managed separately by their respective CAs 408A-N. The platform certificate is issued by the platform's CA 406 and includes the platform's public encryption information and is signed by the platform's CA's private encryption information. In this case, the platform certificate serves to authenticate the identity of the IHS 100, providing a single point of trust for the entire system; but not components 402A-N.

Each component's certificate chain requires individual verification, and the necessary root certificates require acquisition and maintenance by the verifier. The complexity of acquisition and maintenance by the verifier grows as the number of components 402A-N increases.

In the absence of systems and methods described herein, to verify any individual component, host 401 would have to send a signed blob of data from that component to the verifier, and verifier would have had to have acquired the Root Certificate for the platform certificate prior to any verification activity. For components that the verifier knows about prior to verification, the verifier may acquire their root certificates in advance and store them in its certificate store. For components that the verifier does not know about beforehand, the verifier may acquire their root certificates at the time of verification. These activities are duplicated for all instances of the verifier, ensuring that each verifier has the necessary root certificates to verify the components on the platform.

The complexity of managing root certificates for components on the platform grows as the number of components 402A-N increases. Each instance of a platform may go through a lifecycle, where components may get replaced in different revisions of the platform. The root certificates on the platform need to be kept up to date, adding another layer of complexity to the management process.

As the inventors hereof have recognized, managing and verifying the certificates for numerous components on a platform can be complex and time-consuming. This process leads to potential inefficiencies and increased risk of errors. Additionally, the need to keep root certificates up to date adds another layer of complexity, especially when components are replaced, removed, or added during the platform's lifecycle.

To address these, and other concerns, systems and methods described herein streamline the attestation framework by embedding root certificates for components into a platform certificate. This approach consolidates the management of root certificates into a single platform certificate, reducing the complexity and time required for verification.

By embedding the root certificates into the platform certificate, these systems and methods may ensure that verifiers can verify the identity of components without needing to acquire root certificates for components. (Note: a component may have a single root certificate. Two of the same parts from a single manufacturer may share the same root certificate.) These systems and methods also facilitate verification in air-gapped networks or other environments where access to trusted sources for root certificates may be limited or unavailable.

Particularly, the streamlining provided by these systems and methods may relieve verifiers from the task of acquiring root certificates for components, as this information is provided by the attesting platform and verified via the platform's root certificate. Second, the verification service does not depend on the availability of trusted sources for root certificates, enabling attestation even when these sources are unavailable or cannot be reached. Third, the time required for verification may be reduced, as verifiers do not need to acquire root certificates during the verification process. Fourth, verifiers may save time by not having to acquire root certificates for components added to the platform, such as through additions or part replacements, as the delta certificate includes the root certificates for these components.

In addition to embedding root certificates for each component of IHS 100 into the platform certificate, as IHS 100 goes through changes, at various stages of its lifecycle there may be insertion and/or removal of one or more components. These changes may cause corresponding delta platform certificates to be issued, and, in some cases, these delta platform certificates may be added to the platform certificate.

Figure 5:
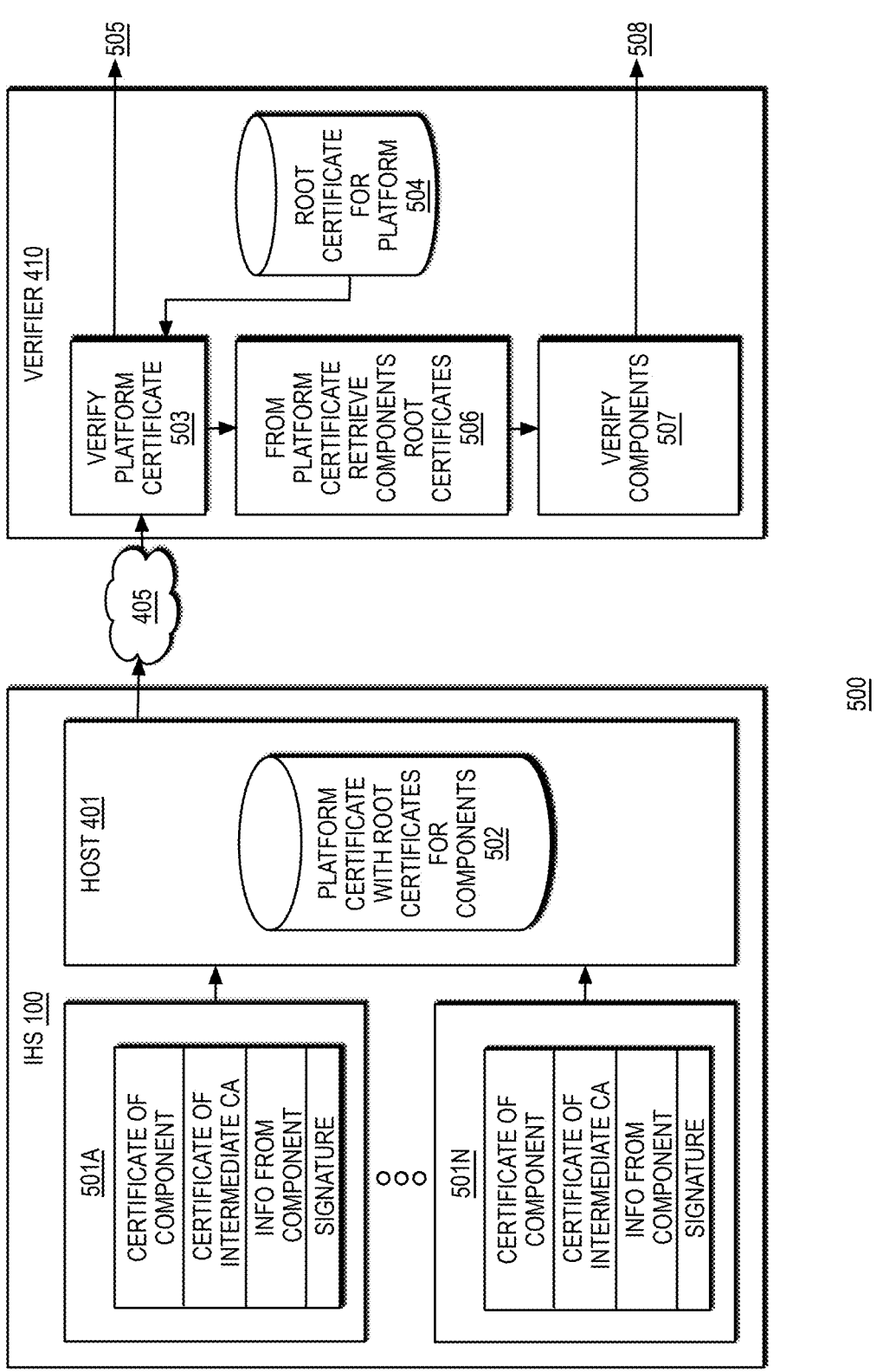
FIG. 5 is a diagram illustrating an example of a system for streamlined IHS component attestation, according to some embodiments.

FIG. 5 is a diagram illustrating an example of system 500 for streamlined IHS component attestation. Particularly, system 500 includes several components usable to embed root certificates for components into a platform certificate, thereby simplifying the attestation framework.

Embedding root certificates for components into a platform certificate is generally a manual process. A person operating system 500 may acquire them in an out-of-band manner and include them into the CSR to be signed by a CA determined by the platform owner, thereby generating the signed certificate, or simply the certificate, for the platform. During this process, a component may present its root certificate, which can be read by the person assembling roots certificates, and the person may use it for reference, but the person will rely on root certificate it acquires from the source the person trust.

Host 401 may include EC/BMC 109, configured to execute firmware instructions for coordinating the operations of various components. Host 401 is responsible for receiving root certificates from each of the components and ensuring that the certificates are properly managed and stored. Moreover, host 401 gathers the necessary certificate information and embed the root certificates for each component into the platform certificate.

In some cases, root certificates for components 501 may be manually collected by a person or personnel and maintained by the platform owner before components are assembled into IHS 100. The person may be responsible for the integrity of root certificates of components needed by verifiers for verifying components. Root certificates for components 501A-N may include, for example: a certificate of the component, a certificate of an intermediate CA, information from the component (e.g., ID, serial number, vendor, etc.), and a signature. These root certificates serve to authenticate the identity and integrity of each component, ensuring that component can be trusted within the IHS.

At attestation time (e.g., upon boot-up, by user request, as initiated by a host OS, etc.), host 401 may send platform certificate 502 to verifier 410 over network 405 for verification. At 503, verifier 410 may compare platform certificate 502 received from host 401 against a copy stored in database 504. Depending upon whether the two certificates match, verifier 410 may output a "pass/fail" message 505 to another entity or service.

At 506, verifier 410 may retrieve component root certificates embedded into platform certificate 502. At 507, verifier 410 may verify each of components 402A-N using the retrieved component root certificates. Depending upon whether the verification is successful, verifier 410 may output a "pass/fail" message 508 to another entity or service.

Overall, system 500 streamlines the attestation framework by embedding root certificates for components into a single platform certificate. This approach consolidates the management of root certificates, reducing complexity and administrative overhead. Verifiers can verify the identity of components using the platform certificate, ensuring a more efficient and secure attestation process.

Figure 6:
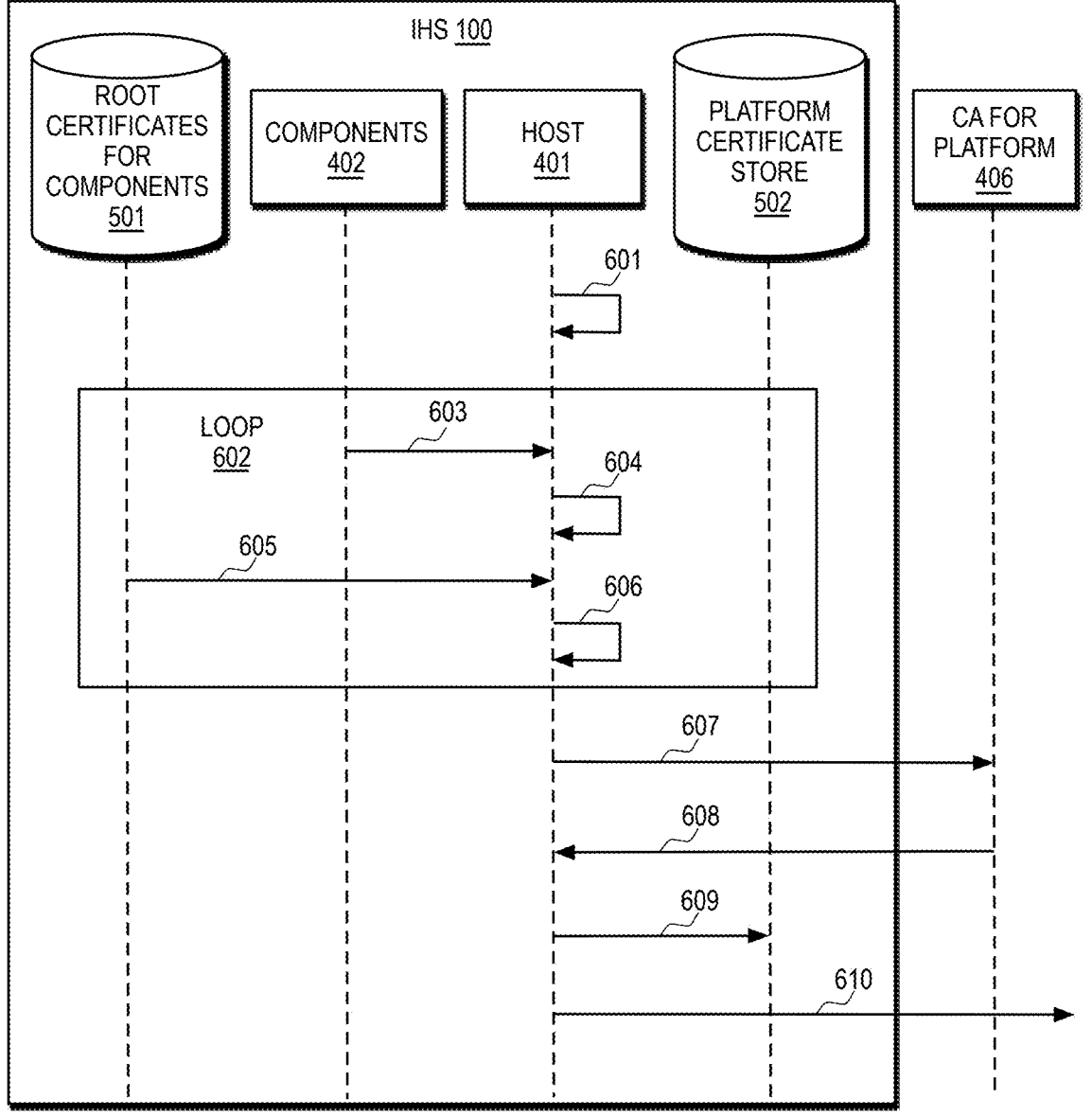
FIG. 6 is a diagram illustrating an example of a method for producing a platform certificate that includes the root certificates for each component, according to some embodiments.

FIG. 6 is a diagram illustrating an example of method 600 for producing a platform certificate that includes the root certificates for each component. In various embodiments, method 600 may be performed, at least in part, by host 401 of IHS 100.

Specifically, at 601, platform host 401 collects information about IHS 100 in a CSR. Loop 602 repeats operations 603-606 for each of components 402A-N.

At 603, a component sends a signed blob of data to host 401. At 604, host 401 adds the data to the CSR. At 605, a root certificate 501 for the component being processed is provided to host 401. At 606, host 401 adds the component root certificate to the CSR.

At 607, host 401 sends the CSR to platform CA 406. At 608, platform CA 406 issues and sends a platform certificate to host 401. The platform certificate includes the platform's public key and is signed by the CA's private key. The platform certificate also includes the embedded root certificates for each component. At 609, host 401 stores a copy of the platform certificate in store 502. Method 600 ends at 610, where host 401 makes the platform certificate available for component verification.

In sum, method 600 involves a platform host collecting information about the IHS and its components. Each component sends a signed blob of data, including its chain of certificates, to the platform host. The platform host adds this data to the CSR, including the root certificates for each component. Once the CSR is assembled, the platform host sends it to the platform CA. The platform CA verifies the information in the CSR and issues a platform certificate, which the host makes available for verification purposes, ensuring that verifiers can verify the identity and integrity of the components using the platform certificate.

Figure 7:
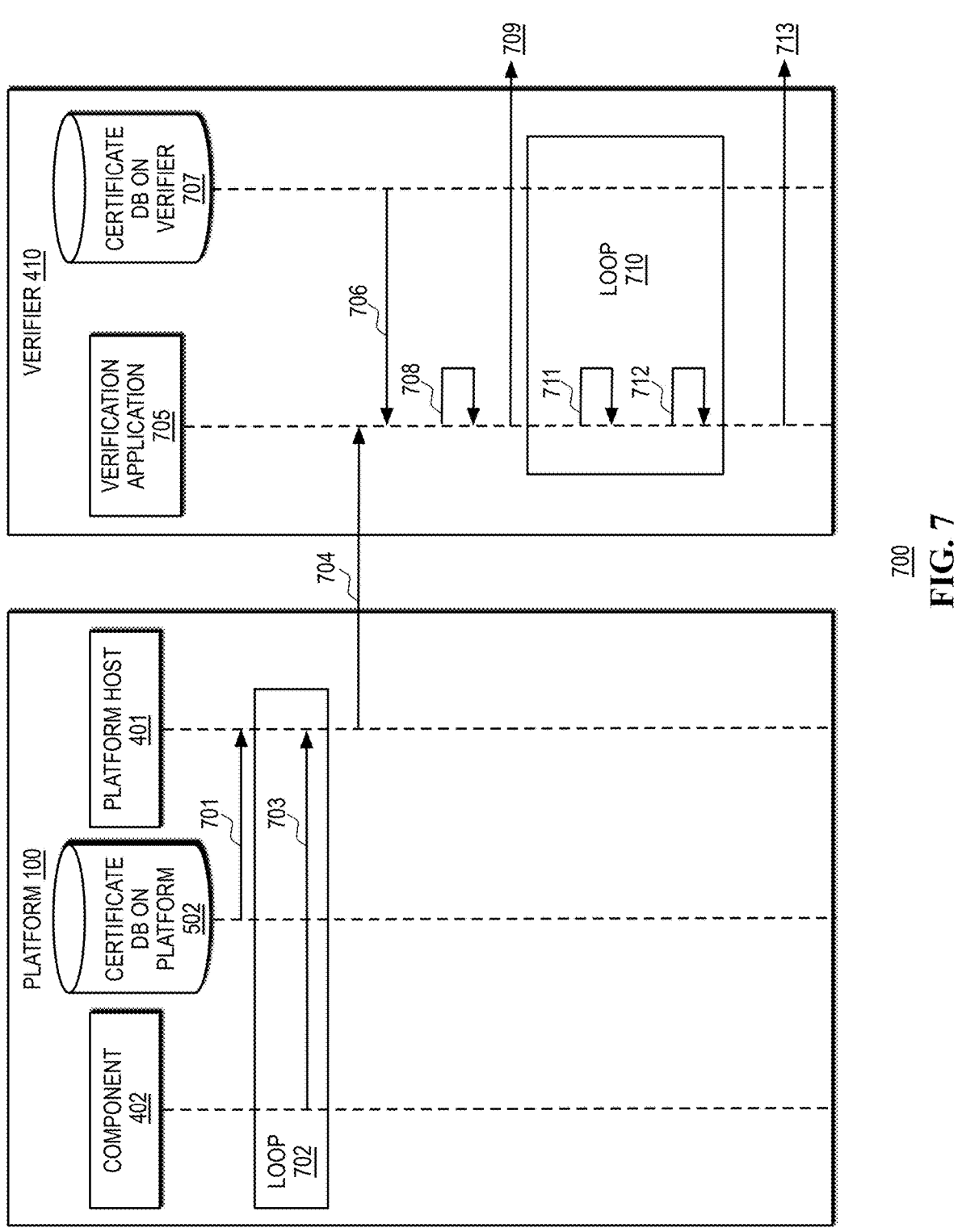
FIG. 7 is a diagram illustrating an example of a method for verifying a component using platform certificate, according to some embodiments.

In that regard, FIG. 7 is a diagram illustrating an example of method 700 for verifying a platform certificate including a component root certificate. In various embodiments, method 700 may be performed, at least in part, by host 401 of IHS 100.

At 701, host 401 retrieves the platform certificate from certificate DB on platform 502. At loop 702, for each component, host 401 receives a signed blob of data from that component at 703. At 704, host 401 sends the platform certificate and a collection of signed blobs of data for all components to verification application 705 of verifier 410.

At 706, verification application 705 receives a copy of the platform root certificate and/or a root certificate for IHS 100 from certificate database on verifier 707. At 708, verification application 705 verifies the platform certificate, and at 709 it sends a message to another entity or service indicating whether the verification of the platform has been successful.

At loop 710, for each component, at 711 verification application 705 may retrieve a root certificate for that component from the platform certificate. At 712, verification application 705 may verify the signed blob of data for that component, and at 713 it may send a message to another entity, such as host 401, indicating whether the verification of that individual component has been successful, before method 700 ends.

The platform certificate, which includes root certificates for all components, is first presented to the verifier. The verifier verifies the platform certificate using the platform's root certificate to ensure it was issued by a trusted CA. Once the platform certificate is verified, the verifier uses the root certificates for each component embedded into the platform certificate to verify the identity and integrity of each component. The verifier checks the chain of certificates for each component. This process allows the verifier to efficiently and securely verify all components within IHS 100 without needing to acquire and manage individual root certificates for each component.

In some implementations, host 401 may be configured to evaluate what needs to be verified, and it may first assess the scope of the verification request to determine how to proceed. For example, if the request involves verifying the entire platform or a minimum number of components, host 401 may determine that the platform certificate, which includes root certificates for each component embedded into the platform certificate, is sufficient for the verification.

However, if the request involves verifying selected component(s) fewer than the total number of components, or if a specific component may not have its root certificate embedded into the platform certificate, host 401 may retrieve the individual certificate for the selected or specific component(s) and send it to the same (or another) verifier. The verifier may use the component's individual certificate to verify the identity and integrity of the selected or specific component(s) only, ensuring that they can be trusted within IHS 100, without necessarily verifying all IHS components.

In some cases, this evaluation may be performed at least in part based upon an OEM's or ITDM's policy available to EC/BMC 109, depending upon a selected number or type of component to be verified, and/or any of the contextual information disclosed herein (e.g., IHS location, IHS posture, power source, battery charge, power/performance/security state, network bandwidth or availability, etc.).

This approach may allow host 401 to optimize the verification process by using the platform certificate for comprehensive verification and individual certificates for specific component verification, thereby maintaining flexibility and efficiency in the attestation framework.

As such, systems and methods described may streamline the attestation framework for IHSs by embedding root certificates for components into a single platform certificate. Using these systems and methods, the management of root certificates may be consolidated into the management of a single platform certificate, reducing complexity and administrative overhead.

Moreover, verifiers may be saved from the chore of acquiring and maintaining individual root certificates for each component, as the platform certificate includes all necessary root certificates for components. The platform certificate keeps root certificates for components in synchronization with the platform certificate, ensuring that verifiers always have the most up-to-date information. For example, if a root certificate for a given component expires or is revoked, the platform certificate may be updated to reflect those changes.

These systems and methods also make it possible for verifiers in air-gapped environments or in other environments where access to trusted sources for root certificates may be limited or unavailable to verify attestation, as the platform certificate provides the necessary root certificates for components that may not be accessible from the local network. The verification service may remain available even when trusted sources for root certificates are unavailable, making attestation possible in various scenarios.

Finally, the platform certificate may simplify the verifier workflow and/or reduce the time required for verification, especially as the number of components grows. Overall, these systems and methods provide a streamlined and efficient mechanism for managing and verifying the authenticity of components within an IHS.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a hardware processor; and
a memory coupled to the hardware processor, the memory having program instructions stored thereon that, upon execution, cause the IHS to:
read root certificates for a plurality of components of the IHS; and
embed the root certificates for the plurality of hardware components into a platform certificate.

2. The IHS of claim 1, wherein the plurality of hardware components comprises at least one of: the hardware processor, the memory, a Graphics Processing Unit (GPU), a storage device, a network adapter, a power supply unit, a fan controller, an Input/Output (I/O) controller, a sensor, a Trusted Platform Module (TPM), or an Artificial Intelligence (AI)/Machine Learning (ML) device.

3. The IHS of claim 2, wherein the hardware components are manufactured by one or more third-party suppliers or an Original Equipment Manufacturer (OEM).

4. The IHS of claim 1, wherein the program instructions, upon execution, cause the IHS to:
read the root certificates for the plurality of hardware components from a database; and
insert the root certificates into a Certificate Signing Request (CSR).

5. The IHS of claim 4, wherein to embed the root certificates for the plurality of hardware components into the platform certificate, the program instructions, upon execution, cause the IHS to submit the CSR to a Certificate Authority (CA).

6. The IHS of claim 5, wherein the CSR comprises a signed blob of data for each of the plurality of hardware components and a root certificate for each of the plurality of hardware components.

7. The IHS of claim 6, wherein the program instructions, upon execution, further cause the IHS to issue another CSR to the CA in response to a change to the one or more of the plurality of hardware components.

8. The IHS of claim 1, wherein the program instructions, upon execution, further cause the IHS to receive an updated platform certificate from the CA.

9. The IHS of claim 1, wherein the program instructions, upon execution, further cause the IHS to receive a request to verify one or more of the plurality of hardware components.

10. The IHS of claim 9, wherein the program instructions, upon execution, further cause the IHS to provide the platform certificate to a verifier, wherein the verifier is configured to verify an identity of the one or more of the plurality of hardware components based upon one or more corresponding root certificates embedded into the platform certificate.

11. The IHS of claim 9, wherein the program instructions, upon execution, further cause the IHS to provide the chain of certificates and signed blob of data from each of the plurality of hardware components to the verifier.

12. A method, comprising:

receiving, by a verifier associated with a manufacturer of an Information Handling System (IHS), a platform certificate associated with the IHS, wherein the platform certificate comprises one or more root certificates for a plurality of hardware components of the IHS; and cryptographically verifying, by the verifier based upon the one or more root certificates, identities of the plurality of hardware components.

13. The method of claim 12, wherein the plurality of hardware components comprise at least one of: the hardware processor, the memory, a Graphics Processing Unit (GPU), a storage device, a network adapter, a power supply unit, a fan controller, an Input/Output (I/O) controller, a sensor, a Trusted Platform Module (TPM), or an Artificial Intelligence (AI)/Machine Learning (ML) device.

14. The method of claim 12, wherein the plurality of hardware components are manufactured by third-party suppliers or the manufacturer of the IHS.

15. The method of claim 12, wherein the platform certificate is signed by a Certificate Authority (CA) in response to a Certificate Signing Request (CSR) submitted by the IHS, and wherein the CSR comprises the one or more root certificates for the plurality of hardware components.

16. A hardware memory device having program instructions stored thereon that, upon execution by a hardware processor of an Information Handling System (IHS), cause the IHS to: embed root certificates for a plurality of hardware components of the IHS into a platform certificate, wherein the root certificates are cryptographically trusted by different verifiers associated with manufacturers; and verify the plurality of hardware components based upon the platform certificate through a verifier associated with a manufacturer of the IHS.

17. The hardware memory device of claim 16, wherein to embed the root certificates, the program instructions, upon execution by the hardware processor, cause the IHS to issue a Certificate Signing Request (CSR) to a Certificate Authority (CA).

18. The hardware memory device of claim 17, wherein the CSR comprises the root certificates.

19. The hardware memory device of claim 17, wherein the hardware processor is part of a heterogeneous computing platform selected from the group consisting of: a System-On-Chip (SoC), a Field-Programmable Gate Array (FPGA), and an Application-Specific Integrated Circuit (ASIC).

20. The hardware memory device of claim 19, wherein the heterogeneous computing platform comprises a Reduced Instruction Set Computer (RISC) processor coupled to the hardware processor via an interconnect, and wherein the interconnect comprises at least one of: an Advanced Microcontroller Bus Architecture (AMBA) bus, a QuickPath Interconnect (QPI) bus, or a HyperTransport (HT) bus.

* * * * *